United States Patent [19]
Albert et al.
[11] 4,427,612
[45] Jan. 24, 1984

[54] METHOD FOR SEALING AN ELECTRICAL COMPONENT, PARTICULARLY A RELAY

[75] Inventors: Cornelia Albert, Krailling; Ulf Rauterberg, Munich, both of Fed. Rep. of Germany

[73] Assignee: Siemens Aktiengesellschaft, Berlin & Munich, Fed. Rep. of Germany

[21] Appl. No.: 335,585

[22] Filed: Dec. 29, 1981

[30] Foreign Application Priority Data

Feb. 20, 1981 [DE] Fed. Rep. of Germany ....... 3106371

[51] Int. Cl.[3] ................................................ B29C 3/00

[52] U.S. Cl. ................................ 264/154; 174/52 S; 264/129; 264/230; 264/249; 264/257; 264/265; 264/272.19; 264/273

[58] Field of Search ............... 264/257, 258, 322, 248, 264/265, 266, 60, 61, 80, 293, 272.19, 272.18, DIG. 75, 129, 154, 230, 249, 273; 174/52 S, 52 FP; 335/202

[56] References Cited

U.S. PATENT DOCUMENTS

| | | | |
|---|---|---|---|
| 1,985,997 | 1/1935 | Keeran | 264/248 |
| 3,077,639 | 2/1963 | Siner | 264/265 |
| 3,087,201 | 4/1963 | Williams | 264/257 |
| 3,403,204 | 9/1968 | Peterson | 264/272.18 |
| 3,406,234 | 10/1968 | Bailly | 264/257 |
| 4,062,917 | 12/1977 | Hill | 264/257 |
| 4,176,241 | 11/1979 | Schedele et al. | 174/52 S |
| 4,225,553 | 9/1980 | Mirota | 264/322 |

FOREIGN PATENT DOCUMENTS

| | | | |
|---|---|---|---|
| 54-38384 | 3/1979 | Japan | 264/257 |

*Primary Examiner*—James B. Lowe
*Attorney, Agent, or Firm*—Hill, Van Santen, Steadman & Simpson

[57] ABSTRACT

A fleece is employed for the distribution of casting resin over a component surface to be sealed. Prior to the introduction of the casting resin, pressure is applied on the fleece with a heated stamp in order to smoothen the fleece. Through increased temperature of the stamp, or through a solvent, the fleece can be readily cemented together with the component surface. It is thus ensured that the fleece rests uniformly on the entire component surface to promote a favorable distribution of the casting resin.

9 Claims, 2 Drawing Figures

METHOD FOR SEALING AN ELECTRICAL COMPONENT, PARTICULARLY A RELAY

BACKGROUND OF THE INVENTION

The invention relates to a method for the sealing of an electrical component, particularly a relay, comprising a housing exhibiting individual apertures or joints. First a fleece, i.e. a tissue or non woven fabric covering having a high capillary absorption capacity, is placed over the housing apertures to be sealed. This fleece is subsequently impregnated with a low-viscosity, age-hardenable casting resin.

A method of this type is known from U.S. Pat. No. 4,176,241. It is essentially employed for the purpose of sealing the housing apertures for connecting pins and the housing joints between a base and a protective cap. With the use of fleece, it is possible to effectively distribute a small quantity of casting resin over the entire surface and, in particular, to convey it to the housing aperatures without thus contaminating the projecting connecting pins and without significantly increasing the overall height of a relay or of a similar component.

For the sealing operation it is decisive that the fleece lie in a planar fashion on the housing surface to be sealed, particularly also at the edges, since otherwise unsealed locations can occur. In order to accomplish this, it has already been proposed that during the introduction of the casting resin, a frame be placed on the fleece so as to weight the fleece at the edges until the age-hardening of the casting resin occurs. However, this represents an increased fabrication expense since these frames must consist of a special material, for example polytetrafluoroethylene, in order to avoid an adhesion of the casting resin on the frame. On account of the comparatively long duration of the age-hardening operation (several hours), a large number of these costly frames must be available; moreover, the latter must be cleansed after each use in order to be able to be further used.

SUMMARY OF THE INVENTION

It is an object of the present invention to further develop the method of the initially cited type in such a fashion that the applied fleece adheres well at all locations of the component surface, and thereby ensures a uniform resin distribution and sealing without additional parts such as magazines and contact frames intermittently becoming connected with the component and requiring additional work steps. In accordance with the invention, this object is achieved in that the fleece, immediately prior to the application of the casting resin, is pressed on the component with a heated stamp which is matched to the component surface.

Through the inventive contact-pressing of the fleece with a heated stamp it is ensured that the fleece is already smoothened prior to application of the resin. This resin provides a good and tight connection with the component surface at all locations; and even after the age-hardening, the fleece retains a smooth surface. The stamp for the purpose of contact-pressing the fleece does, indeed, represent an additional device in the fabrication. However, it represents a substantially lower expense than the method of first bringing the relay into a magazine, fitting it with a cover frame, and later again separating these cover frames. Such a frame, of course, must be available for all production units during the entire age-hardening time. They must also be prepared for each new one. By contrast, the inventively employed pressing stamp can be readily integrated in an automated production line.

In an embodiment of the invention, the temperature of the stamp is selected, in dependence upon the material of the fleece, and such that the fleece is smoothened through a brief contact-pressure. In the case of conventional fleece materials, such as synthetic wool or polyester fibers, temperatures of approximately 200° C. are selected. In the case of this method, in contrast with previous conventional methods, fleece materials can also be employed which on account of their tendency toward wave formation or buckling, could previously not be used, such as for example, polyester.

It can furthermore be expedient to select the temperature of the stamp, by adaptation to a thermoplastic housing material, such that the housing surface is molten and becomes cemented together with the fleece. In the case of conventional thermoplastics, temperatures of approximately 240° C. are selected. Insofar as the fleece covers larger free areas, it can also be expedient to provide the fleece beginning with slots from the edge in order to prevent a later removal of the fleece in every instance.

In a further embodiment of the inventive method, the fleece, prior to pressing-on of the stamp, is impregnated with a small quantity of a solvent which attacks the housing material. In this case, the housing surface is somewhat dissolved and, upon pressing-on of the stamp, becomes cemented together with the fleece. It can suffice to apply the solvent only at a few locations, preferably in the marginal region of the housing. The capillary effect of the fleece is already utilized in this case prior to the introduction of the casting resin for the distribution of the solvent. The solvent can, for example, be applied on the fleece through openings of the stamp. The advantage of this method lies primarily in that, for the stamp, a substantially lower temperature than in the case of the above-cited methods can be selected; for example, a stamp temperature of approximately 40° C. suffices. This is important in the case of very thin-walled housings which could become warped or deformed at high stamp temperatures.

The solvent can be applied directly on the fleece, for example through openings in the stamp. One thus largely avoids the occurrence of harmful solvent vapors. Moreover, conventional solvents are employed, such as for example, trichloroethene, perchloroethene, acetone, or methylene chloride. Since, through a large-area adhesion of the fleece its capillary effect could be impaired, the flow of the casting resin from a filling location to remote housing edges can be improved by means of additional grooves in the housing surface. This can be of an advantage in the case of large housing surfaces which are to be sealed, such that from a filling location, the casting resin then first travels via individual channels beneath the fleece and reaches the remote edges, and is there distributed from the channels through the fleece over the entire surface.

DESCRIPTION OF THE PREFERRED EMBODIMENTS

Figure 1:
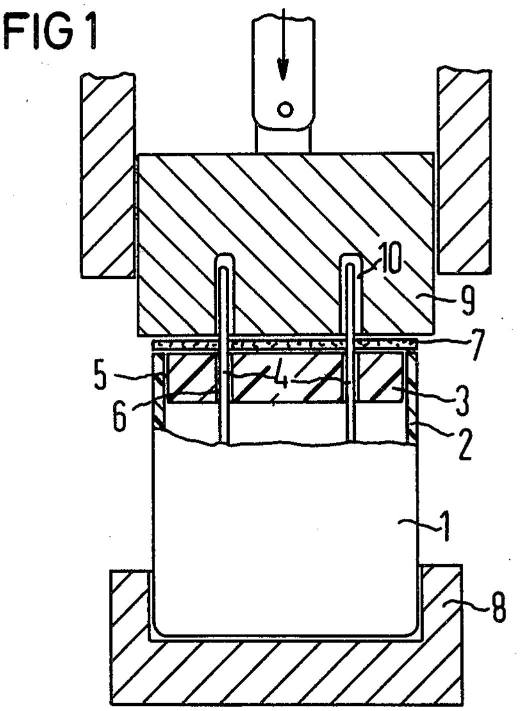
FIG. 1 illustrates an apparatus for the contact-pressing of the fleece with a heated stamp.

On the basis of FIG. 1, the pressing-on of the fleece is generally described. A component 1, for example a relay, is illustrated with a housing cap 2 (partially sectioned) and a base 3 through which connection pins 4 are guided toward the exterior. The housing thus exhibits joints 5 between the housing cap 2 and the base 3 as well as aperture 6 in the base for the connections 4, which are to be commonly sealed with a fleece 7 and with casting resin.

In order to avoid a removal of the fleece, particularly at the edges prior to the age-hardening of the casting resin introduced into the fleece, the component 1 is transported on a transport frame 8 under a heated stamp 9 which is briefly pressed perpendicularly onto the fleece. This stamp 9 is precisely matched to the component surface. It thus possesses, for example, recesses 10 for the connection pins 4. Also, graduations of the component surface which may possibly be present, and which are not illustrated here, are taken into consideration through corresponding matching of the stamp surface, so that the fleece 7 is uniformly pressed onto the component surface and smoothened by means of the heated stamp.

As already described, the temperature of the stamp can be so selected that the component surface is readily molten and cemented together with the fleece. It could be sufficient here that, for example, only the edge of the cap 2 is cemented all around together with the fleece 7.

Figure 2:
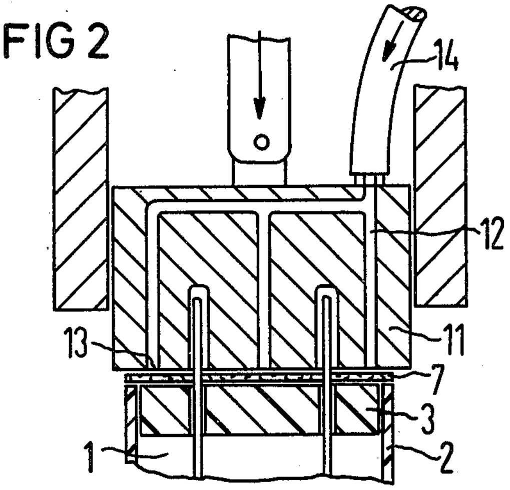
FIG. 2 illustrates an apparatus with additional solvent supply.

FIG. 2 illustrates a somewhat modified embodiment. The component 1, as in FIG. 1, possesses a cap 2 and a base 3 whose housing openings are covered with the fleece 7. For the purpose of pressing on the fleece, a heated stamp 11 is employed which additionally exhibits a channel system 12 with openings 13 in the direction of the contact-pressure side. Via a supply hose 14, solvent in small dosing can be brought onto the fleece 7 in order to slightly dissolve the surface of the component and to cement it together with the fleece 7. The solvent can be introduced shortly before or while the stamp is being securely pressed onto the fleece.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for sealing an electrical component having a housing with an end-side surface to be sealed, comprising the steps of: providing a tissue-like unimpregnated fleece layer having high capillary absorption capacity and dimensioned for said end-side surface being sealed; uniformly pressing the fleece layer onto said end-side surface with a heated stamp surface-wise and dimensionally matched to said end-side surface; selecting a temperature of the stamp depending upon a type of fleece material being used such that the fleece layer lies in a planar fashion on said end-side surface, is smoothened, and adheres at all locations of said end-side surface; impregnating the fleece layer with a low-viscosity, age-hardenable casting resin; and a temperature of the stamp being selected according to a thermoplastic material of the housing such that portions of the housing surface at said end-side is molten and becomes cemented together with the fleece layer.

2. The method of claim 1 wherein the stamp is removed prior to impregnating.

3. The method according to claim 1 wherein prior to application on the component, the fleece layer is slotted from a marginal region thereof.

4. The method according to claim 1 wherein the fleece layer prior to pressing-on with the stamp is impregnated with a small quantity of a solvent which attacks the housing material.

5. The method according to claim 4 wherein the solvent is applied only at a marginal region of the fleece layer.

6. The method according to claim 4 wherein a solvent which attacks the housing material layer is applied on the fleece through openings of the stamp.

7. A method for sealing an electrical component having a housing with an end-side surface to be sealed, comprising the steps of: providing a tissue-like unimpregnated fleece layer having high capillary absorption capacity and dimensioned for said end-side surface being sealed; uniformly pressing the fleece layer onto said end-side surface with a stamp surface-wise and dimensionally matched to said end-side surface and selecting a temperature of the stamp depending upon a type of fleece material being used such that the fleece layer lies in a planar fashion on said end-side housing surface, is smoothened and adheres at all locations of said end-side surface; applying a solvent which attacks a material of the housing so as to cause the housing to bond to the fleece layer when the stamp is removed; and impregnating the fleece layer with a low-viscosity age-hardenable casting resin.

8. A method for sealing an electrical component having a housing with an end-side surface to be sealed, comprising the steps of: providing a tissue-like unimpregnated fleece layer having high capillary absorption capacity and dimensioned for said end-side surface being sealed; applying a solvent at said end-side surface which attacks a material of the housing and uniformly pressing the fleece layer onto said end-side surface with a stamp surface-wise and dimensionally matched to said end-side surface, a temperature of the stamp being selected depending upon a type of fleece material being used such that the fleece layer lies in a planar fashion on said end-side surface, is smoothened, and adheres at all locations of said end-side surface; and impregnating the fleece layer with a low-viscosity age-hardenable casting resin.

9. A method for sealing an electrical component having a housing with an end-side surface to be sealed, comprising the steps of: providing a tissue-like unimpregnated fleece layer having high capillary absorption capacity and dimensioned for said end-side surface being sealed; uniformly pressing the fleece layer onto said end-side surface with a heated stamp surface-wise and dimensionally matched to the end-side surface and so as to cause a material of the housing to become molten at said end-side surface so as to join the fleece layer at said end-side surface when the molten housing material cools, a temperature of the stamp being selected depending upon a type of fleece material being used such that the fleece lies in a planar fashion on said end-side surface layer, is smoothened, and adheres at all locations of said end-side surface; removing the stamp; and impregnating the fleece layer with low-viscosity age-hardenable casting resin.

* * * * *